US012163933B2

(12) United States Patent
Fogwill et al.

(10) Patent No.: US 12,163,933 B2
(45) Date of Patent: Dec. 10, 2024

(54) COMPACT LIQUID CHROMATOGRAPHY SYSTEM PROVIDING THERMAL MANAGEMENT AND DETECTION

(71) Applicant: Waters Technologies Corporation, Milford, MA (US)

(72) Inventors: Michael O. Fogwill, Uxbridge, MA (US); Fabrice Gritti, Franklin, MA (US)

(73) Assignee: Waters Technologies Corporation, Milford, MA (US)

( * ) Notice: Subject to any disclaimer, the term of this patent is extended or adjusted under 35 U.S.C. 154(b) by 156 days.

(21) Appl. No.: 17/736,371

(22) Filed: May 4, 2022

(65) Prior Publication Data

US 2022/0357304 A1 Nov. 10, 2022

Related U.S. Application Data

(60) Provisional application No. 63/183,797, filed on May 4, 2021.

(51) Int. Cl.
*G01N 30/30* (2006.01)
*G01N 30/20* (2006.01)
(Continued)

(52) U.S. Cl.
CPC ............ *G01N 30/30* (2013.01); *G01N 30/20* (2013.01); *G01N 30/466* (2013.01); *G01N 30/7233* (2013.01); *G01N 2030/3046* (2013.01)

(58) Field of Classification Search
CPC ........... B01D 15/161; G01N 30/16–24; G01N 30/30–2030/3092
See application file for complete search history.

(56) References Cited

U.S. PATENT DOCUMENTS 3,635,093 A * 1/1972 Downs ................... G01N 30/18
73/864.86
4,879,039 A * 11/1989 Takahashi ............. G01N 30/12
436/178
(Continued)

FOREIGN PATENT DOCUMENTS

CN 108226364 A 6/2018
EP 3070469 A1 * 9/2016 ............. G01N 30/30
(Continued)

OTHER PUBLICATIONS

Machine Translation (FIT) of CN 108226364 A (Year: 2023).*
(Continued)

*Primary Examiner* — David L Singer
(74) *Attorney, Agent, or Firm* — Goodwin Procter LLP

(57) ABSTRACT

Liquid chromatography systems described herein are smaller in size and with a reduced extra-column volume due to direct connection of a liquid chromatography column and/or detector to an injector valve and due to eliminating the need for a column oven by relying on heating of the liquid chromatography column and detector by a preheater. The size of the liquid chromatography systems are enough that the liquid chromatography systems may be deployed adjacent to automated sample preparation robotics, adjacent to a process stream, or adjacent to the inlet of a mass spectrometer. In addition, the extra-column volume of the liquid chromatography systems may be reduced by eliminating many of the connection tubes and by situating components of the liquid chromatography system in closer proximity.

5 Claims, 14 Drawing Sheets

(51) Int. Cl.
*G01N 30/46* (2006.01)
*G01N 30/72* (2006.01)

(56) References Cited

U.S. PATENT DOCUMENTS

| | | | |
|---|---|---|---|
| 2003/0061867 A1 | 4/2003 | Gerner et al. | |
| 2005/0257885 A1* | 11/2005 | Hobbs | G01N 21/05 156/293 |
| 2006/0054543 A1 | 3/2006 | Petro et al. | |
| 2006/0266708 A1* | 11/2006 | Yu | G01N 30/88 210/656 |
| 2007/0134808 A1* | 6/2007 | Sullivan | G01N 30/24 436/180 |
| 2007/0175270 A1* | 8/2007 | Lunsford | G01N 30/30 138/91 |
| 2013/0052083 A1* | 2/2013 | Kirby | F24H 1/142 392/465 |
| 2015/0135861 A1* | 5/2015 | Cook | G01N 30/30 73/863.11 |
| 2018/0231511 A1* | 8/2018 | Tanaka | G01N 30/74 |

FOREIGN PATENT DOCUMENTS

| | | | | |
|---|---|---|---|---|
| JP | H0469569 A | * | 1/1997 | G01N 30/44 |
| JP | 2010243215 A | * | 10/2010 | G01N 30/54 |
| WO | WO-2013140917 A1 | * | 9/2013 | G01N 30/30 |

OTHER PUBLICATIONS

Wang et al, A Remote Flow Cell for UV Absorbance Detection with Capillary HPLC Based on a Single Strand Fiber Optic, Article in The Analyst, Jul. 2000 (Year: 2000).*
International Search Report and Written Opinion for International Patent Application No. PCT/US2022/027610, mailed Jul. 15, 2022.
International Preliminary Report on Patentability for International Patent Application No. PCT/US2022/027610, mailed Nov. 16, 2023.

* cited by examiner

COMPACT LIQUID CHROMATOGRAPHY SYSTEM PROVIDING THERMAL MANAGEMENT AND DETECTION

CROSS-REFERENCE TO RELATED APPLICATIONS

This application claims the benefit of and priority to U.S. Provisional Patent Application No. 63/183,797, filed on May 4, 2021, the entire contents of which are incorporated by reference.

BACKGROUND

To ensure high performance and robust operation, conventional liquid chromatography systems may deploy thermal management for the separation column. The thermal management seeks to avoid or diminish thermal gradients and maintain a constant thermal environment. FIG. 1 depicts an illustrative liquid chromatography system 100 that provides thermal management. The liquid chromatography system 100 includes a mobile phase pump 102 that pumps the mobile phase formed of a solvent mixture toward the liquid chromatography column 108. A sample injector 104 inject a sample solution into the flow of mobile phase headed to the liquid chromatography column 108. The liquid chromatography column is positioned inside a column oven 110. The column oven 110 provides thermal management by attempting to keep the temperature of the exterior of the liquid chromatography column 108 at the same temperature as the interior of the liquid chromatography column 108. This helps to reduce the thermal flux through walls of the liquid chromatography column 108 and thus, helps to reduce thermal gradients and drift due to changing temperature in the lab environment. Thermal management is also provided by preheater 106. The preheater 106 heats the mobile phase to a desired set point prior to the mobile phase entering the liquid chromatography column. The mobile phase may then heat the liquid chromatography column as the heated mobile phase passes through the column. Connection tubing 112 connects the outlet of the liquid chromatography column 108 with a detector 114 for detecting analytes as they elute.

The use of the column oven 110 significantly increases the size of the liquid chromatography system as the column oven 110 is large. Given the value of space in workplaces where the liquid chromatography systems are used, the additional size required by the column oven may be problematic. Moreover, the distance between the components of the liquid chromatography system 100 dictates the use of connection tubing of length that adds volume to the system. The added volume may result in peak broadening, pressure drop, and decreased throughput.

SUMMARY

In accordance with a first inventive aspect, a liquid chromatography assembly includes a liquid chromatography column and a preheater for heating a mobile phase prior to the mobile phase entering the liquid chromatography column. The liquid chromatography column also includes an injector valve for injecting a sample solution into the liquid chromatography column. The preheater and the liquid chromatography column are directly connected to the injector valve.

The preheater and liquid chromatography column may be directly connected to the injector valve so as to create a flow path where the mobile phase enters the preheater to be heated, flows through the injector valve for injection of a sample and then flows to the liquid chromatography column. The liquid chromatography column may include a mechanical interface for directly connecting with the injector valve. The preheater may include a mechanical interface for directly connecting with the injector valve. The liquid chromatography assembly may include insulation for insulating the liquid chromatography column and the preheater while directly connected to the injector valve.

In accordance with another inventive aspect, a liquid chromatography assembly includes a liquid chromatography column and a preheater for heating a mobile phase prior to the mobile phase entering the liquid chromatography column. The liquid chromatography column also includes an injector valve for injecting a sample solution into the liquid chromatography column. The preheater and the liquid chromatography column are directly connected to the injector valve such that the liquid chromatography column and the preheater are in sufficient proximity and oriented for the preheater to heat the liquid chromatography column for thermal management of the liquid chromatography column.

The preheater and the liquid chromatography column may be oriented such that a longitudinal axis of the liquid chromatography column is substantially parallel with a longitudinal axis of the preheater. The preheater may at least partially surround the liquid chromatography column. Alternatively, the preheater may at least partially surround the injector valve or otherwise be in thermal contact with the injector valve. The preheater may fully surround at least a portion of the liquid chromatography column. The preheater may at least partially surround only a portion of the liquid chromatography column. The liquid chromatography column may include a mechanical interface for directly connecting with the injector valve. The preheater may include a mechanical interface for directly connecting with the injector valve. The liquid chromatography assembly may include insulation for insulating the liquid chromatography the liquid chromatography column and the preheater while directly connected to the injector valve.

In accordance with another inventive aspect, a liquid chromatography assembly includes a liquid chromatography column and a preheater for heating a mobile phase prior to the mobile phase entering the liquid chromatography column. The liquid chromatography assembly also includes an injector valve for injecting a sample into the liquid chromatography column, the preheater and the liquid chromatography column being directly connected to the injector valve. The liquid chromatography assembly additionally includes an optical flow detector connected to the liquid chromatography column for detecting the sample as it elutes from the liquid chromatography column.

The optical flow detector may be a light-guided fiber-coupled flow cell. The optical flow detector may be a cross-capillary fiber-coupled remote optical flow cell. The preheater and the liquid chromatography column may be oriented such that a longitudinal axis of the liquid chromatography column is substantially parallel with a longitudinal axis of the preheater. The liquid chromatography assembly may also include insulation for insulating the liquid chromatography column and the preheater while directly connected to the injector valve. In some embodiments, the optical detection flow cell may be in thermal communication with the preheater to reduce thermal mismatch between the fluid entering the cell and the body of the cell, which can cause noise in the resulting chromatogram.

The liquid chromatography column may include a mechanical interface for directly connecting with the injector valve. The preheater may include a mechanical interface for directly connecting with the injector valve.

DETAILED DESCRIPTION

Exemplary embodiments described herein address the above described problems of liquid chromatography systems. The exemplary embodiments may provide liquid chromatography systems that are smaller in size than conventional liquid chromatography systems. The size we are referencing herein is the size of the dead volume between components of the liquid chromatography system. The reduced size of the exemplary embodiments results from decreasing the dead volume between the components of the liquid chromatography system. The exemplary embodiments may reduce the size of the liquid chromatography systems enough that the liquid chromatography systems of the exemplary embodiments may be deployed on a lab bench. The reduced size also improves the ability to deploy the liquid chromatography column adjacent to automated sample preparation robotics, adjacent to a process stream for at line or on line closed-loop control or adjacent to the inlet of a mass spectrometer. In addition, the exemplary embodiments may reduce the extra-column volume of the liquid chromatography system by eliminating many of the connection tubes found in conventional liquid chromatography systems and by situating components of the liquid chromatography system in closer proximity.

Some of the reduction in size of the liquid chromatography systems of exemplary embodiments may be due to the elimination of a column oven from the exemplary embodiments. Thermal management for the liquid chromatography system may be achieved in part, despite the elimination of the column oven, by an arrangement where a preheater serves to not only heat the mobile phase but also to heat the exterior of the liquid chromatography column by being positioned in close proximity to the liquid chromatography column. The preheater may also heat the injector valve and/or an optical detector cell.

Further reductions in size are achieved by directly connecting the liquid chromatography column and the preheater to an injector valve. Connection tubes are not needed to interconnect the injector valve, the preheater and the liquid chromatography column. Stiff further, an optical detector cell may be used that may be connected to the outlet of liquid chromatography column in close proximity. The net result may be a liquid chromatography assembly that is reduced in size and extra-column volume relative to conventional liquid chromatography systems.

Figure 2:
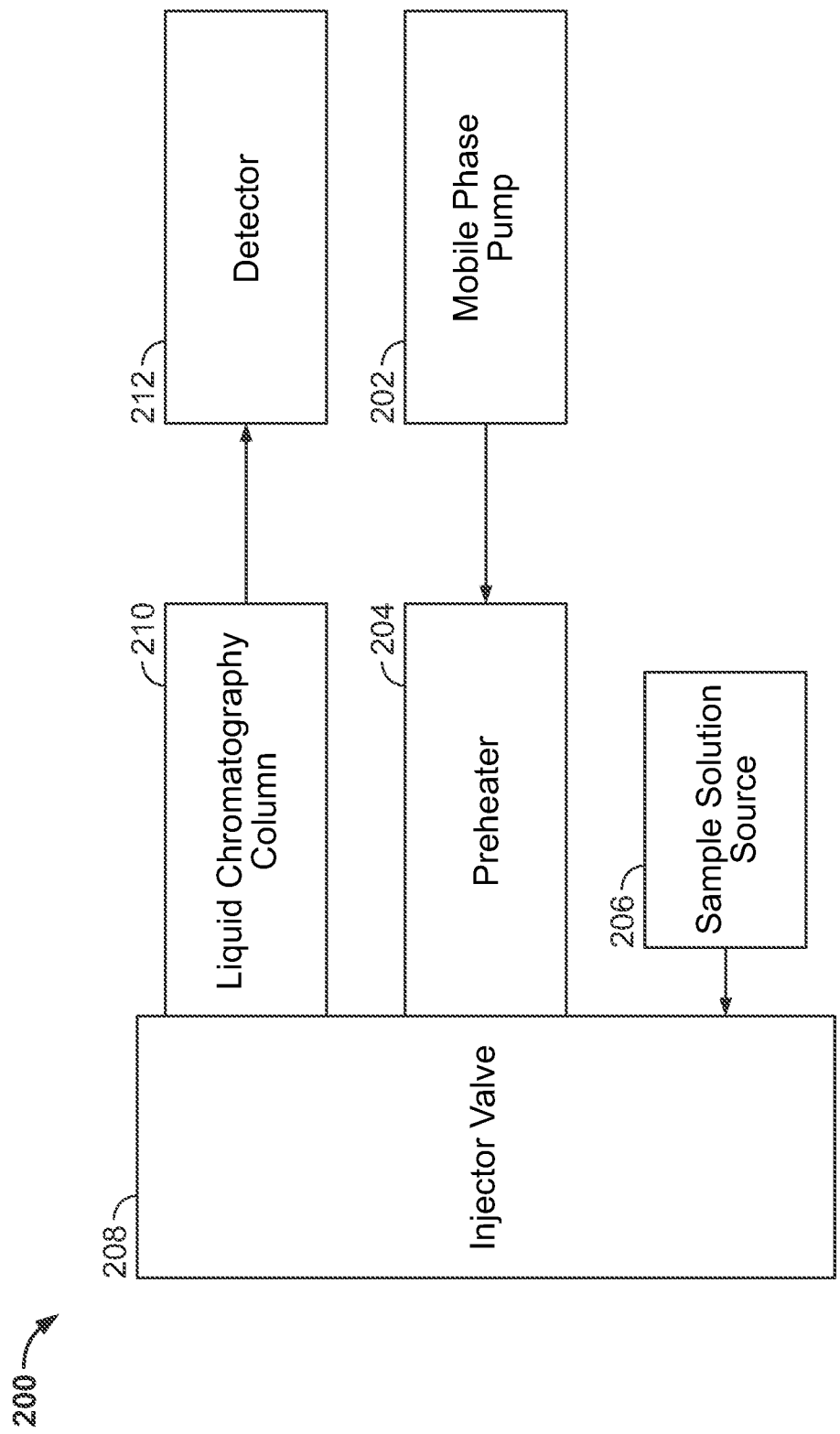
FIG. 2 depicts a block diagram of a liquid chromatography assembly of an exemplary embodiment.

FIG. 2 depicts an illustrative liquid chromatography assembly 200 in accordance with an exemplary embodiment. In this liquid chromatography assembly 200, a mobile phase pump 202 pumps the mobile phase along a flow path leading to a preheater 204. The preheater 204 heats the mobile phase to a desired temperature. The preheater 204 may be directly connected to the injector valve 208 via a mechanical connection, such as via steel tubing with conical ferrules/nuts or other suitable connectors. The preheater 204 may partially or fully surround the injector valve 208 or may simply be in thermal communication with the injector valve 208. A sample solution source 206 is also connected to the injector valve to provide a sample solution. The sample solution from the sample solution source 206 is injected into the mobile phase flow via the injector valve 208. The mobile phase with the injected sample solution flows through the injector valve 208 and enters liquid chromatography column 210. The liquid chromatography column 210 may be directly connected to the injector valve 208. The mobile phase with the injected sample solution passes through the liquid chromatography column 210 and the eluent may be detected by detector 212.

The direct connection of the liquid chromatography column 210 to the injector valve 208 and the direct connection of the preheater 204 to the injector valve 208 help decrease the extra-column volume of the liquid chromatography assembly 200. This decrease in volume relative to conventional liquid chromatography systems helps to decrease chromatographic peak broadening and reduce analyte loss to active metal surfaces in the analyte flow path.

Figure 3A:
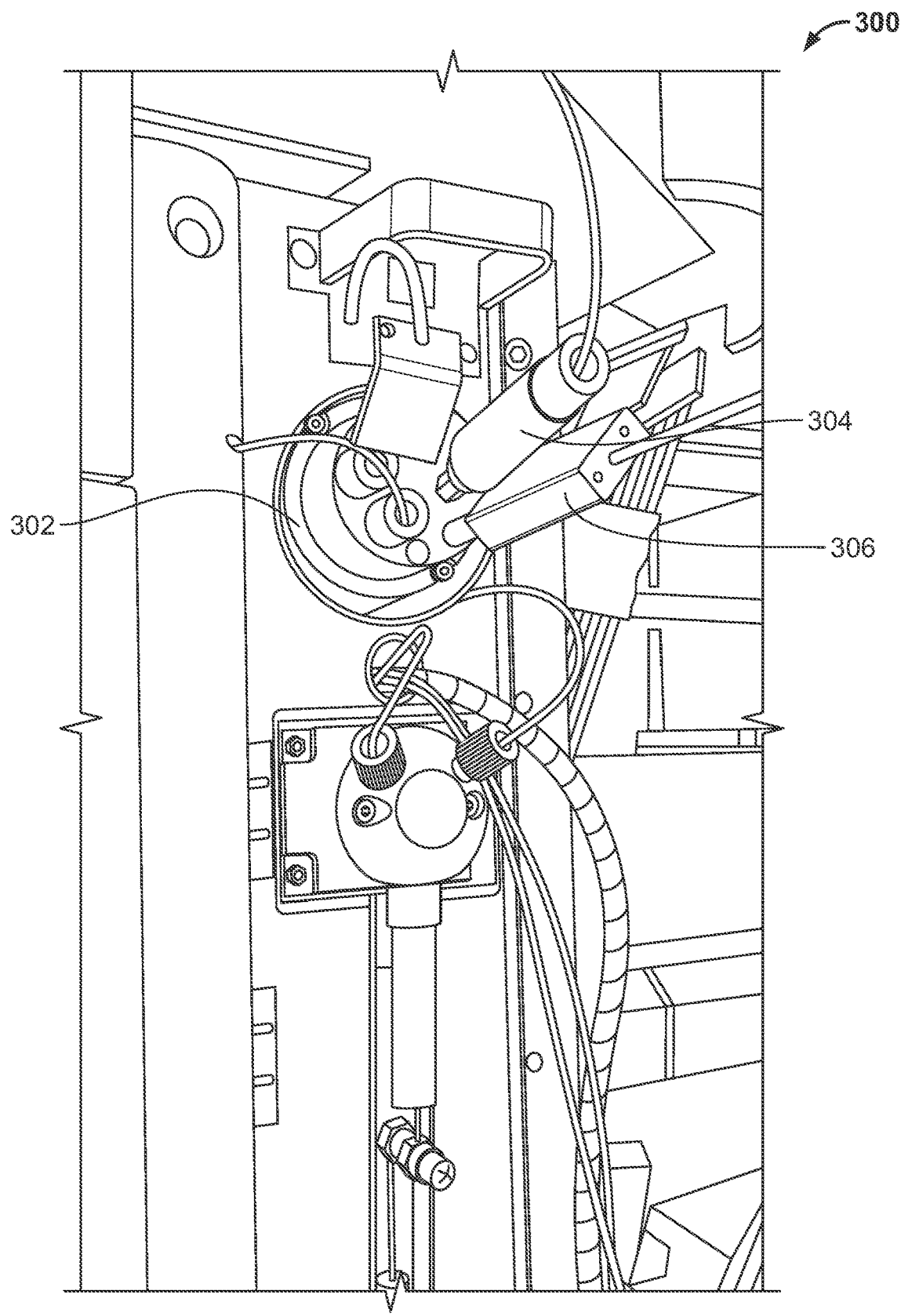
FIG. 3A depicts an illustrative physical arrangement of a liquid chromatography assembly of an exemplary embodiment.

FIG. 3A depicts an illustrative physical arrangement of a liquid chromatography assembly 300 in accordance with an exemplary embodiment. The liquid chromatography column 304 and the preheater 306 are directly connected to the injector valve 302. The liquid chromatography column 304 is positioned in proximity with the preheater 306 so that the preheater 306 may heat the outside of the liquid chromatography column 304. In some embodiments, the liquid chromatography column 304 and the preheater 306 are positioned as close together as possible without touching to maximize heat transfer. Both the liquid chromatography column 304 and the preheater 306 extend longitudinally from the injector valve 302 such that the longitudinal axes of the liquid chromatography column 304 and the preheater 306 are substantially parallel to each other and substantially perpendicular to the front face of the injector valve 302.

It should be appreciated that the preheater 306 and the liquid chromatography column 304 need not be arranged in a substantially parallel arrangement. Other non-parallel arrangements are possible.

Figure 3B:
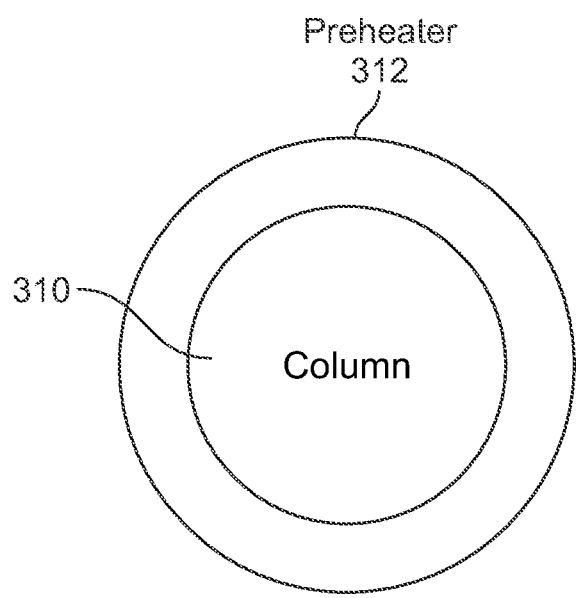
FIG. 3B depicts a cross-sectional view of a preheater fully surrounding a liquid chromatography column in an exemplary embodiment.
Figure 3C:
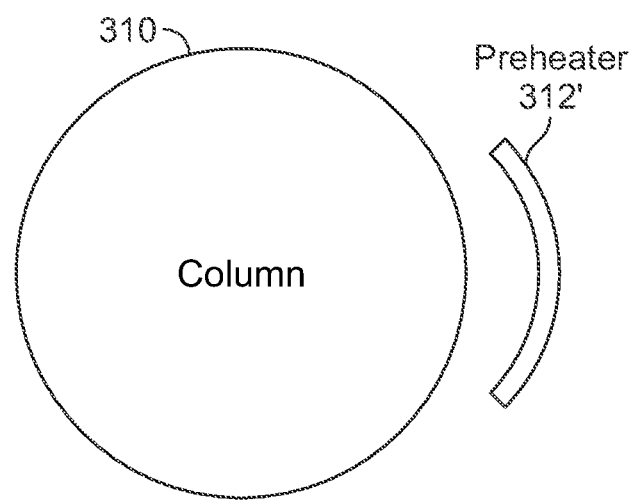
FIG. 3C depicts a cross-sectional view of a preheater partially surrounding a liquid chromatography column in an exemplary embodiment.

Other physical arrangements of the liquid chromatography column and the preheater may be used by exemplary embodiments. For example, as shown in FIG. 3B from a cross-sectional view, the preheater 312 may surround the liquid chromatography column 310 entirely in some embodiments. The heat from the preheater 312 flows radially from the preheater 312 to the liquid chromatography column 310. The preheater 312 need not entirely surround the liquid chromatography column 310. FIG. 3C shows an example suitable for an exemplary embodiment in which the preheater 312' has an arcuate profile and only surrounds a portion of the liquid chromatography column 310 circumference. It will be appreciated that the preheater may be configured to surround the liquid chromatography column in varying degrees.

Figure 4A:
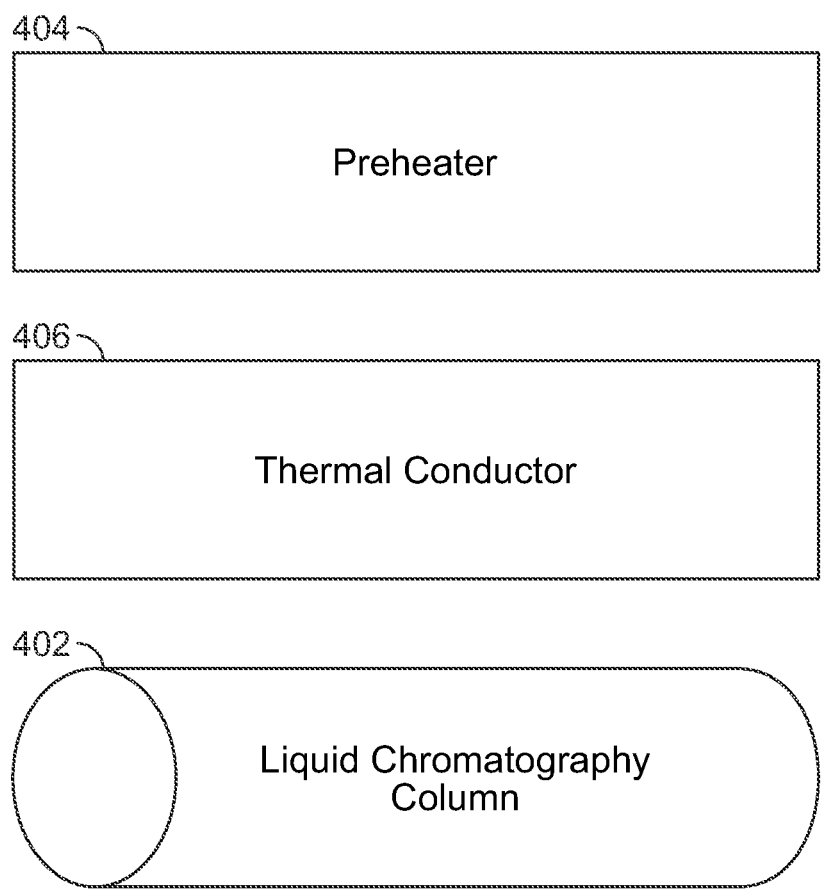
FIG. 4A depicts a preheater extending the full length of a liquid chromatography column in an exemplary embodiment.
Figure 4B:
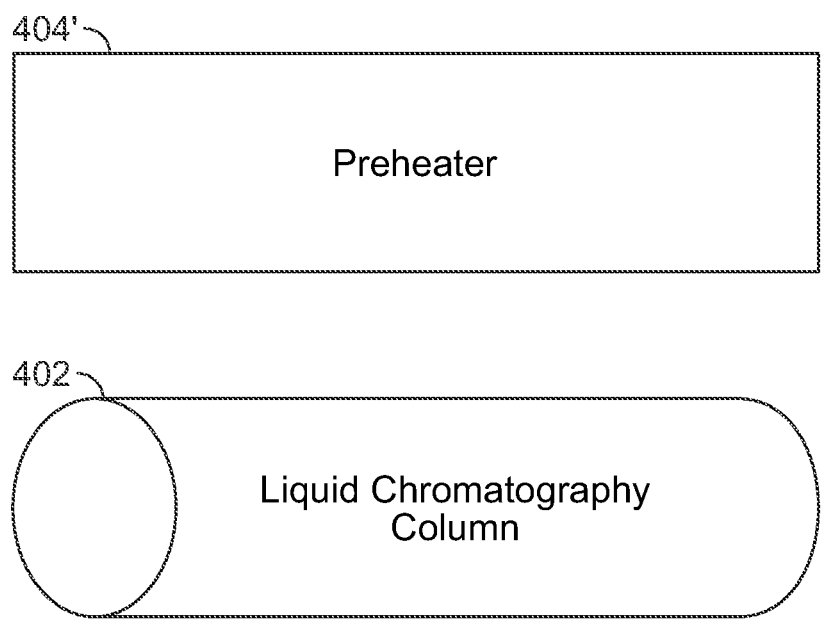
FIG. 4B depicts a preheater extending only a partial length of a liquid chromatography column in an exemplary embodiment.

As shown in FIG. 4A, the preheater 404 may extend the entire length of the liquid chromatography column 402 in some embodiments. This configuration may ensure that heat is applied across the entire length of the liquid chromatography column 402. A thermal conductor 406 may be added to the preheater 404 to act as a heat exchanger that heats the entire liquid chromatography column 402. In some embodiments, the thermal conductor 406 is not needed. Alternatively, as shown in FIG. 4B, in some embodiments, the preheater 404' may extend over only a portion of the length of the liquid chromatography column 402. It should be appreciated that the preheater may extend different lengths than shown. A thermal conductor like 406 may be used or omitted in some instances. Moreover, the preheater 404 may comprise multiple discrete heating elements that each extend across a separate portion of the length of the liquid chromatography column 402.

Figure 5:
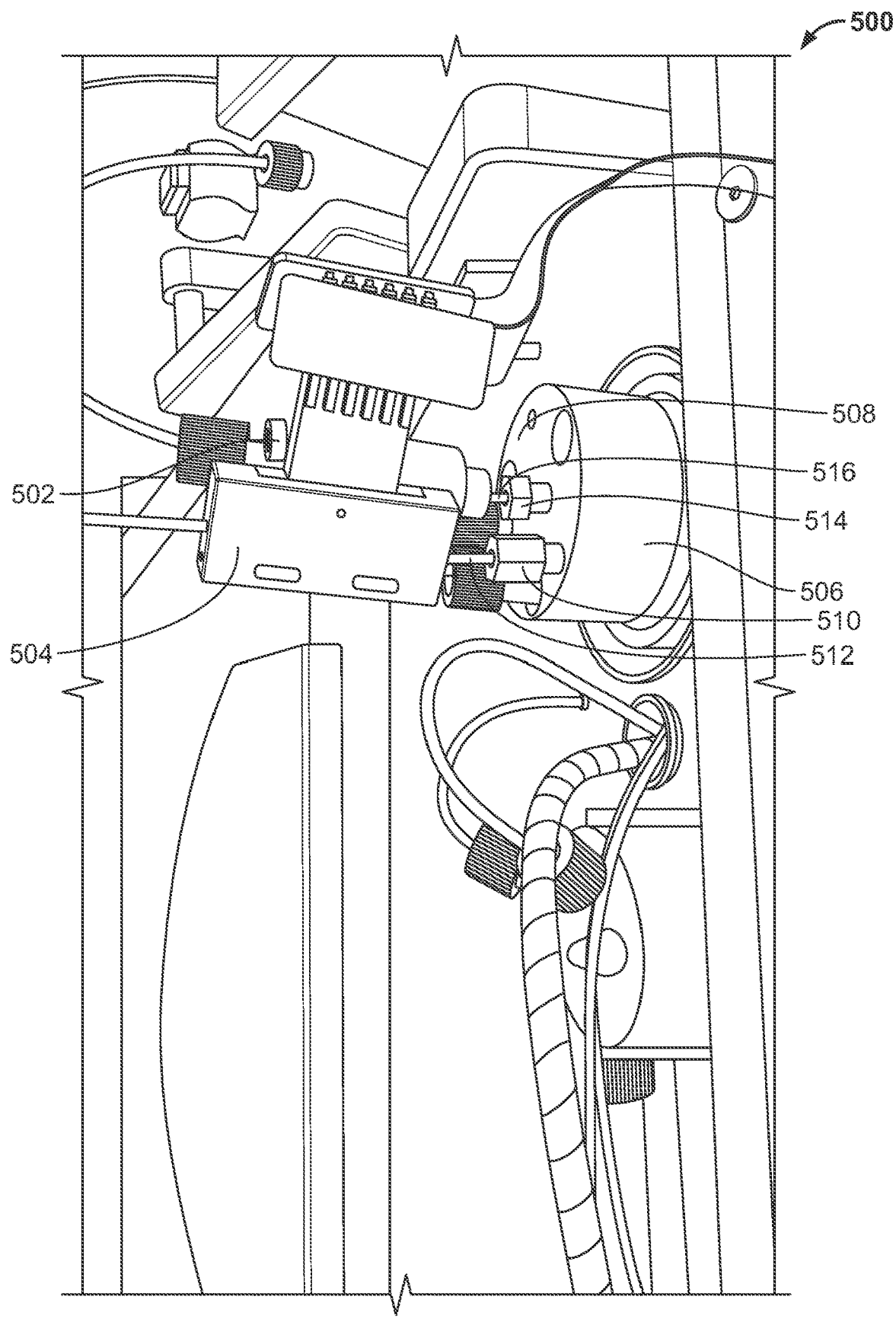
FIG. 5 depicts an illustrative view of a liquid chromatography assembly with fittings for the preheater and liquid chromatography column of an exemplary embodiment.

As was mentioned above, the preheater and the liquid chromatography column are directly connected to the injector valve in some arrangements. To facilitate such direct connections, fittings are provided for the preheater and the liquid chromatography columns that facilitate connections with the injector valve. FIG. 5 depicts an example liquid chromatography assembly 500 that includes fittings for the liquid chromatography column 502 and the preheater 504 to connect with the injector valve 506. The injector valve 506 has ports 508 with built in female connectors having grooves. The liquid chromatography column 502 and the preheater 504 need to connect with respective ones of these ports 508. To that end, the fitting for the preheater 504 includes a male connector 510 that mates with the female connector of a port. The male connector 510 may be threaded to match the groves in the female connector of the port. A tube 512 of metal or other suitable material is provided as part of the fitting and is interfaced with the male connector. The tube 512 provides a fluid passageway from the preheater 504 to the injector valve 506. Similarly, the liquid chromatography column 502 has a fitting with a threaded male connector 514 that mates with female connector at a port of the injector valve 506. A tube 516 of metal or other suitable material is provided as part of the fitting and interfaces with the male connector 514. The tube 516 provides a fluid passageway for carrying the mobile phase from the injector valve 506 into the liquid chromatography column 502.

Figure 6:
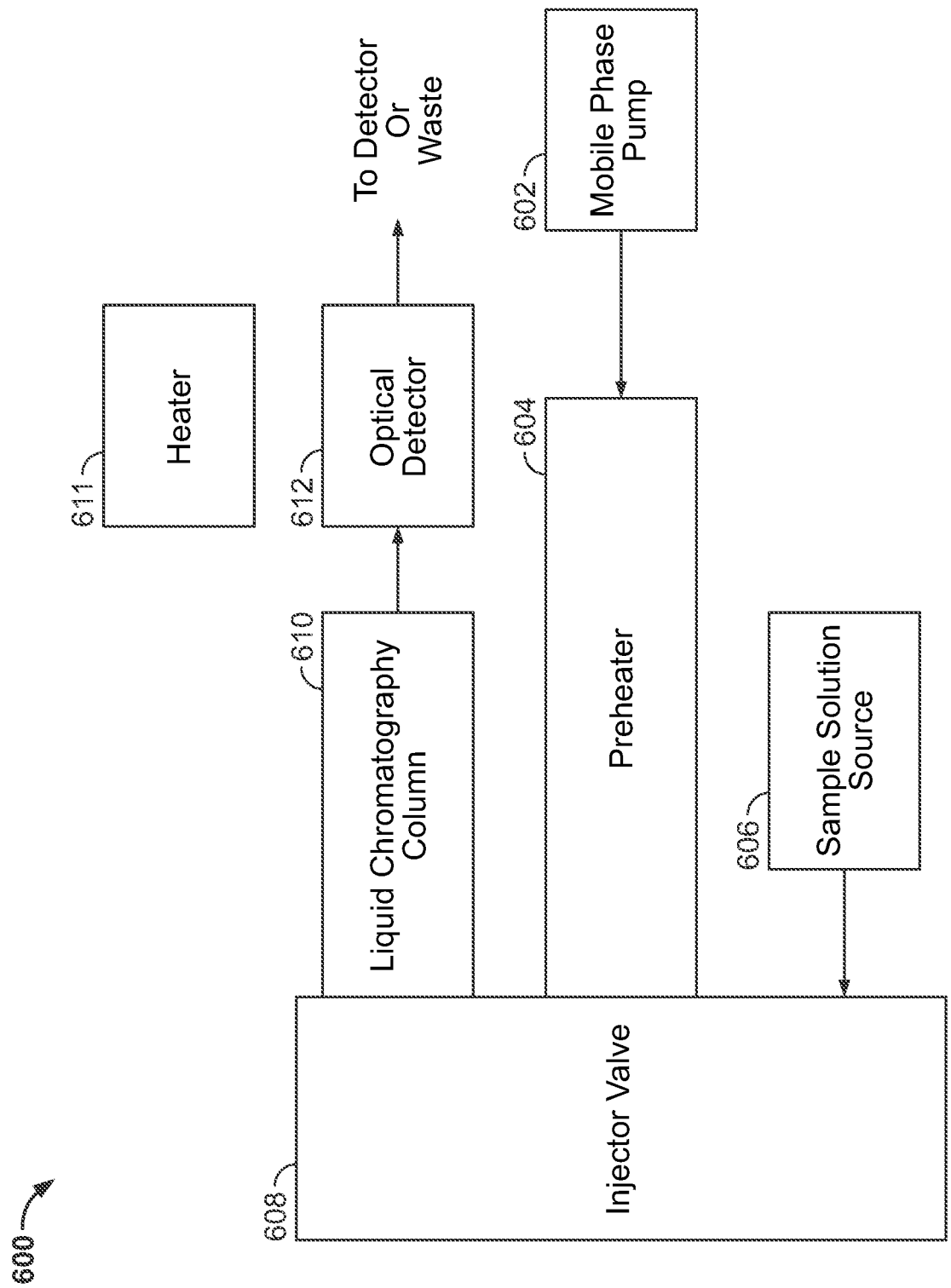
FIG. 6 depicts a block diagram of a liquid chromatography assembly with an optical detector for an exemplary embodiment.

FIG. 6 depicts a liquid chromatography assembly 600 that additionally includes a fiber-coupled optical detector 612. Like the assembly 100 of FIG. 1, the assembly 600 includes a preheater 604 and a liquid chromatography column 610 directly connected to an injector valve 608, such as described above. A sample solution source 608 is also connected to the injector valve 608. A mobile phase pump 602 is provided as well. The optical detector 612 receives the output from the liquid chromatography column 610 and performs optical detection on the analytes. The optical detectors 612 may be closely connected to the liquid chromatography column 610, such as via a short as possible steel tube with a ferrule/nut. The output from the optical detector 612 may flow to waste or to another detector, such as a mass spectrometer. Due to the absence of an oven and the fiber coupling, the optical detector 612 may be positioned in proximity to the liquid chromatography column 610. In some embodiments a heater 611 may be positioned at the outlet of the liquid chromatography column 610. Moreover, the preheater 604 may also impart heat to the optical detector 612.

Figure 7A:
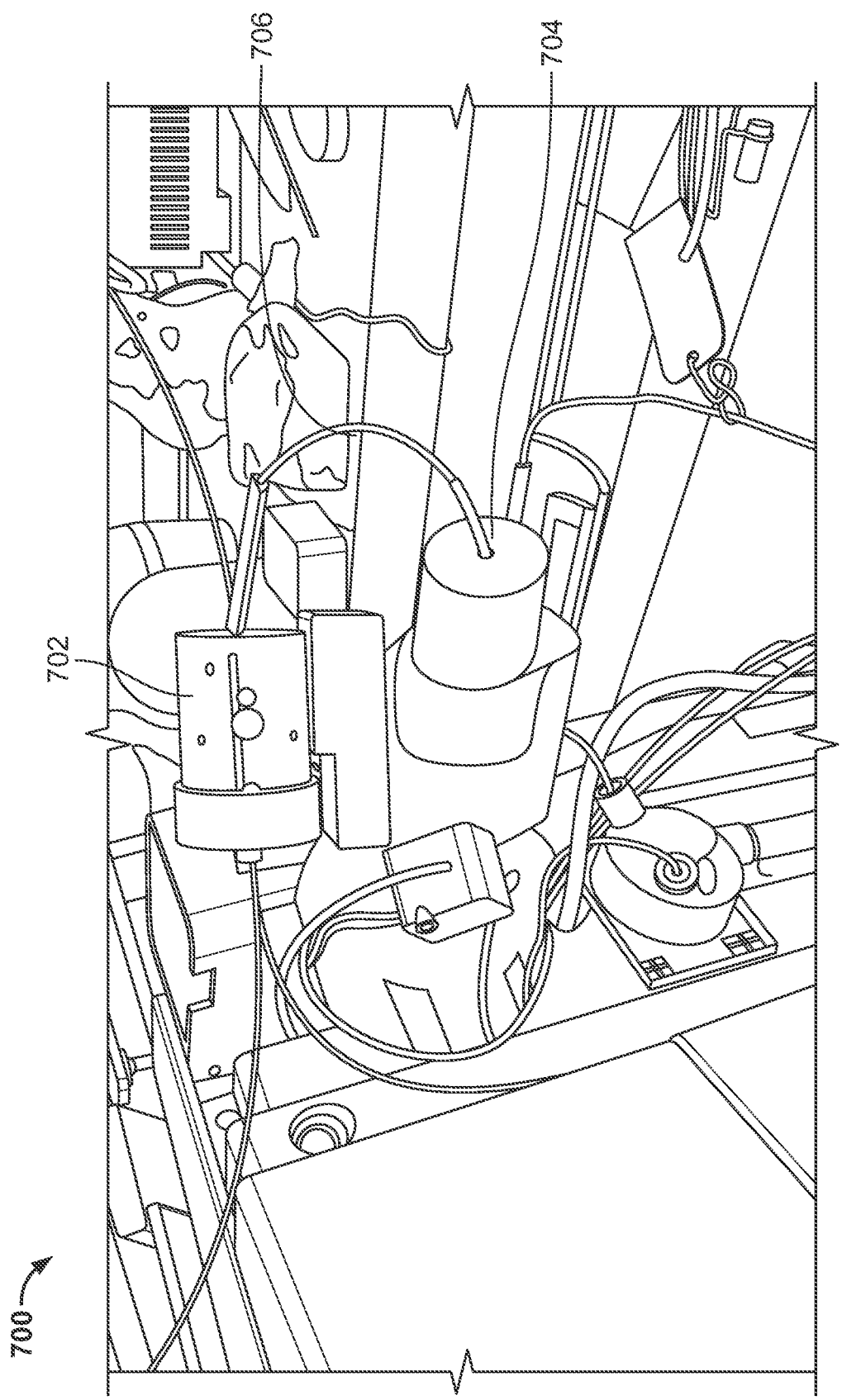
FIG. 7A depicts a physical arrangement of a liquid chromatography assembly with a light-guided fiber-coupled remote flow cell in an exemplary embodiment.

Different types of optical detectors may be used. For example, as shown in FIG. 7A, the assembly 700 includes a light-guided fiber-coupled remote flow cell 702 coupled via an optical fiber 706 with an insulated sub-assembly 704 containing the liquid chromatography column, preheater and the injector valve. The optical flow 702 cell can measure the composition of a droplet based on optical absorption. In this depiction the optical flow cell 702 is positioned on top of the subassembly 704. The assembly 700 is of a smaller size than convention assemblies of such components.

Figure 7B:
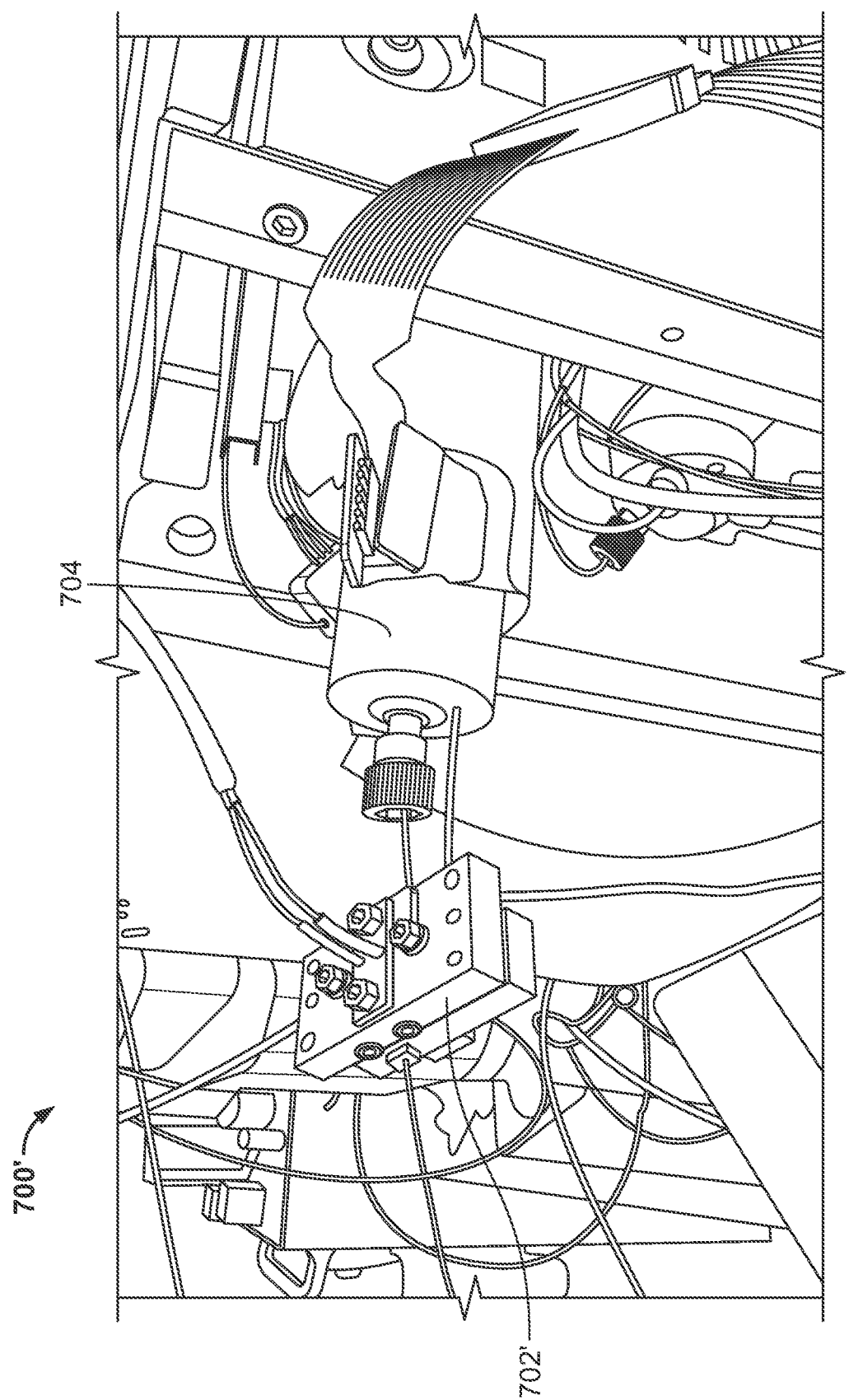
FIG. 7B depicts a physical arrangement of a liquid chromatography assembly with a cross-capillary fiber-coupled remote optical flow cell in an exemplary embodiment.

FIG. 7B depicts the assembly 700' with a cross-capillary fiber-coupled remote optical flow cell 702' coupled to the insulated assembly 704. As can be seen from the depiction of FIG. 7B, the cross-capillary fiber-coupled remote optical flow cell 702' is positioned in proximity to the sub-assembly 704. The entire assembly 700' is of a smaller size than conventional assemblies of such components.

Figure 8:
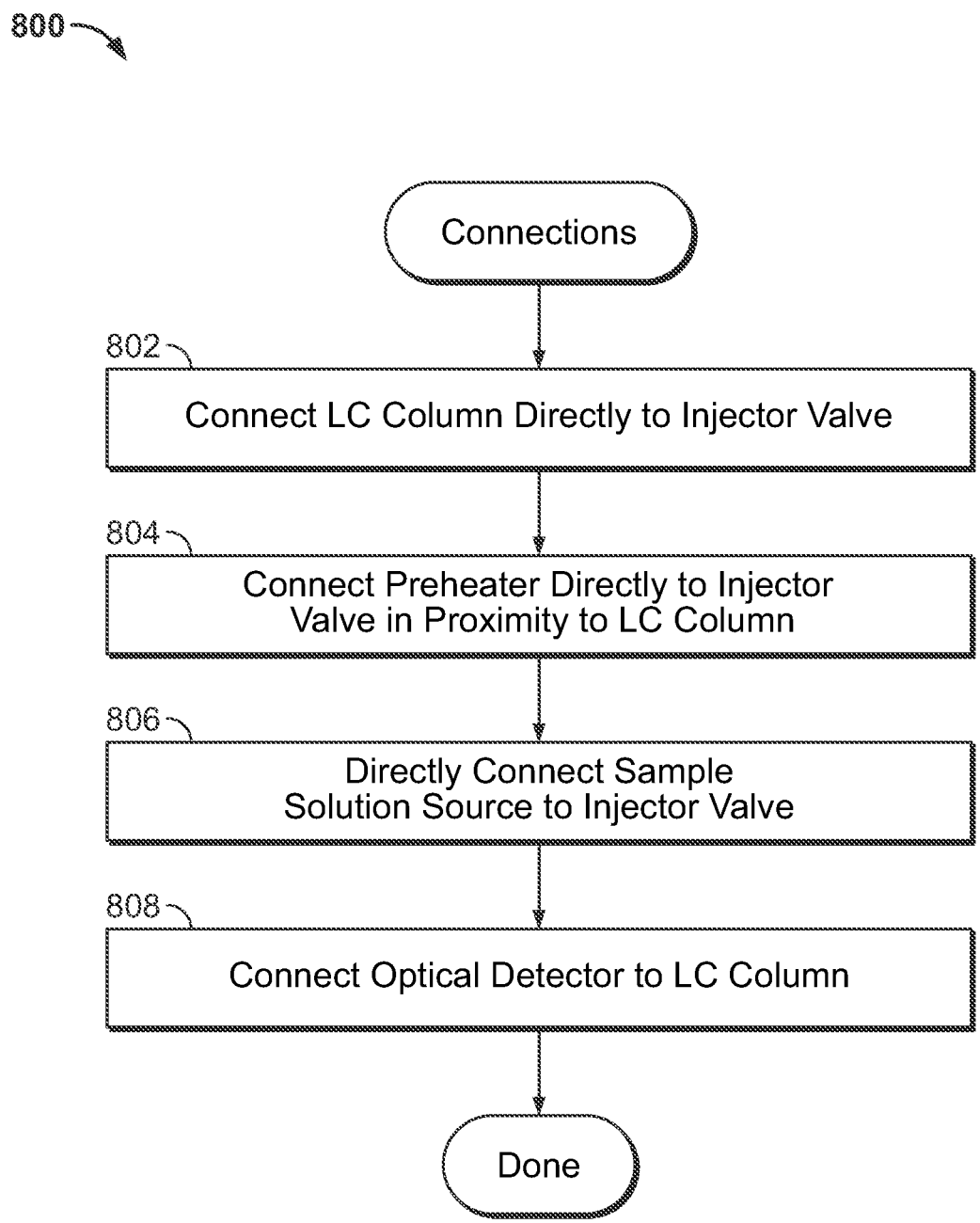
FIG. 8 depicts a flowchart of illustrative steps that may be performed to reduce the length of connection tubes or remove connection tubes from a liquid chromatography assembly that is a part of a liquid chromatography system in an exemplary embodiment.

As was mentioned above, the exemplary embodiments may reduce the extra-column fluidic volume of the system and reduce the overall size of the liquid chromatography assemblies described herein. The exemplary embodiments seek to reduce the length of connection tubes or removal of such connection tubes that interconnect components. FIG. 8 depicts a flowchart 800 of illustrative steps that may be performed to reduce the length of connection tubes or remove connection tubes from a liquid chromatography assembly that is a part of a liquid chromatography system. The liquid chromatography column may be connected directly to the injector valve 802. Fittings, such as described above relative to FIG. 5 may be used for the direct connection. The preheater may be directly connected to the injector valve 804, such as through the use of the fittings described relative to FIG. 5. Then, a fiber-coupled optical detector, such as the optical flow cells of FIGS. 7A and 7B, may be connected to the liquid chromatography column 806.

Figure 1:
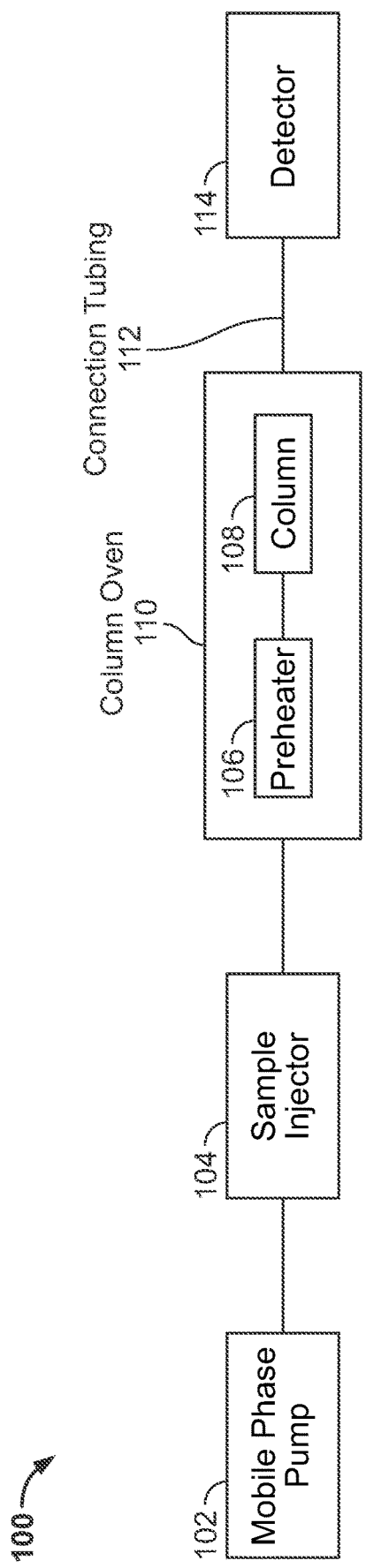
FIG. 1 depicts a block diagram of a convention liquid chromatography system with thermal management.
Figure 9:
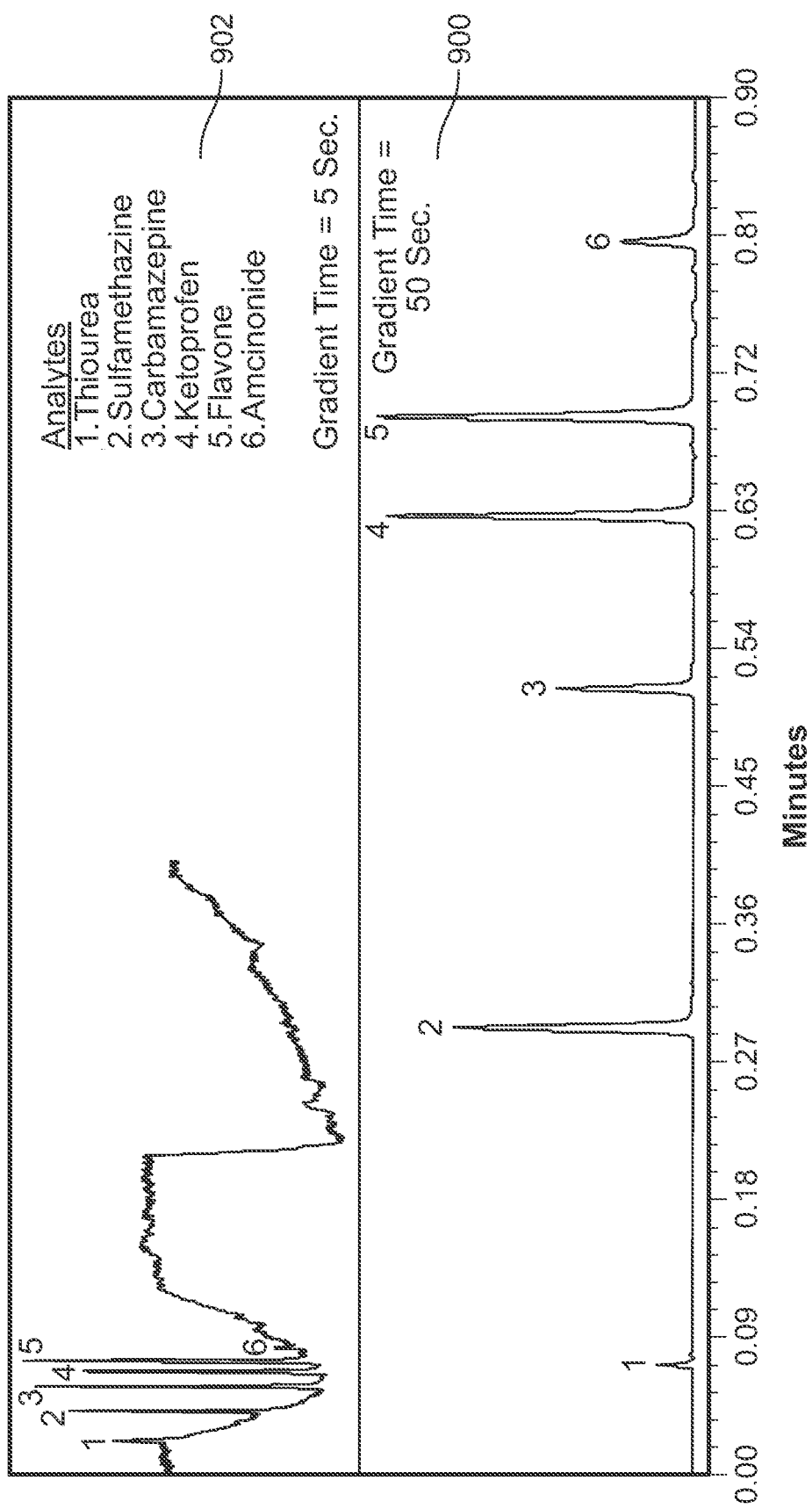
FIG. 9 depicts an illustrative chromatogram for a conventional liquid chromatography system and a chromatogram for a liquid chromatography system of an exemplary embodiment.

FIG. 9 depicts a chromatogram 900 for a liquid chromatography assembly for conventional system with the arrangement like that depicted in FIG. 1. The y axis is absorbance in milli absorbance units, and the x axis is retention time. The chromatogram shows a 50 second gradient time with 6 peaks for the listed analytes: 1. Thiourea; 2. Sulfamethazine; 3. Carbamazepine; 4. Ketoprofen; 5. Flavone; and 6. Amcinonide. The six peaks are labelled with their respective numbers. The column was 3 cm×2.1 mm. The flow rate was 1.0 mL/min with the solvents being 5-95% ACN and 0.02% TFA. The temperature was 45 degrees C.

FIG. 9 also shows a chromatogram 902 of a chromatogram for the accelerated method of the exemplary embodiments with an arrangement like that depicted in FIG. 2. The column was 1 cm×2.1 mm, the flow rate was 2.0 mL/min, the temperature was 70 degrees and the solvents were 5-95% ACN and 0.02% TFA. The gradient time was 5 seconds. Thus, the gradient time was significantly reduced. Like in chromatogram 900, the six peaks are numbered and correspond to the analytes that share the same numbers. As can be seen, the peak widths are significantly reduced relative to the conventional approach. Thus, the approach of the exemplary embodiments can provide greater throughput and high resolution.

Figure 10:
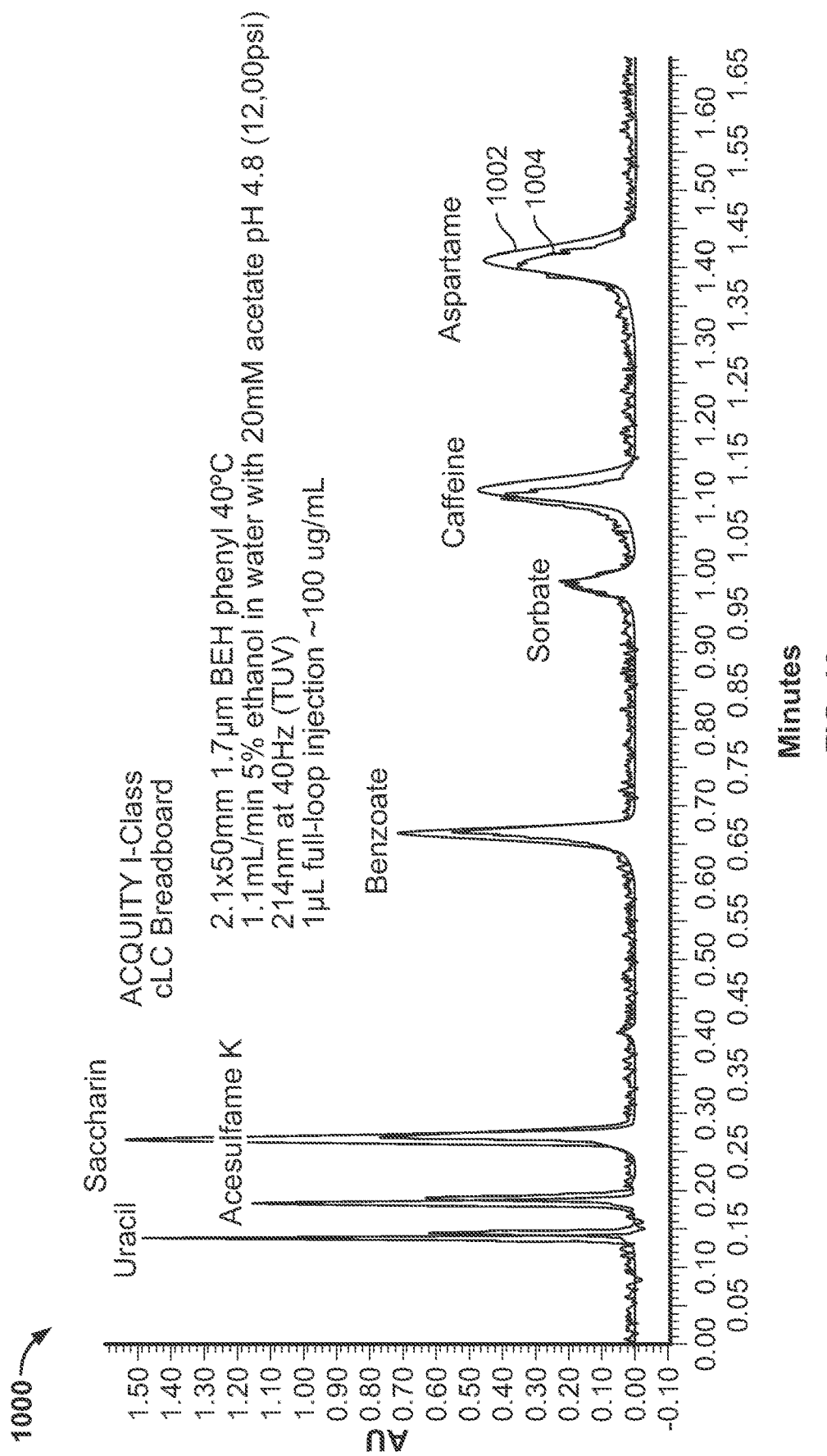
FIG. 10 depicts an illustrative chromatogram for a conventional liquid chromatography system and a chromatogram for a liquid chromatography system of another exemplary embodiment.

FIG. 10 depicts a chromatogram 1000 compares chromatograms 1002 for a conventional liquid chromatography system (i.e., the Waters Acuity I-Class system) with a chromatogram 1004 a liquid chromatography system like FIG. 6 with an outlet heater 611 and a preheater 604 having a thermal conductor. The chromatograms 1002 and 1004 have labelled peaks for the analytes: uracil, acesulfame k, saccharin, benzoate, sorbate, caffeine, and aspartame. As can be seen with the peaks for aspartame, the chromatogram 1004 for the system of FIG. 6 with the heater 611 and a preheater 604 having a thermal conductor has a much tighter peak than the chromatogram for the conventional system. This comparison helps illustrate the benefits of the described approach of having a substantial reduction in the dextra-column volume and using the preheater as described to heat the liquid chromatography column. The Waters Acuity I-Class is a high-end system that has a high level of performance and was chosen as a reference for comparison for that reason. For example, there is about a 18% decrease in peak width for aspartame with the system of FIG. 6, resulting in a large increase in plate count (about 49%).

While the present invention has been described with reference to exemplary embodiments, various in form and detail may be made relative to the exemplary embodiments without departing from the intended scope as defined in the appended claims.

The invention claimed is:

1. A liquid chromatography assembly, comprising:
a liquid chromatography column;
a preheater for heating a mobile phase prior to the mobile phase entering the liquid chromatography column;
an injector valve for injecting a sample into the liquid chromatography column, the preheater and the liquid chromatography column being directly connected to the injector valve; and
an optical flow detector connected to the liquid chromatography column for detecting the sample as it elutes from the liquid chromatography column;
wherein the preheater is positioned in proximity to the liquid chromatography column to apply heat to an exterior of the liquid chromatography column and in proximity to the optical flow detector to apply heat to an exterior of the optical flow detector to provide thermal management; and
wherein the liquid chromatography column includes a mechanical interface for directly connecting with a port of the injector valve and the optical flow detector includes a mechanical interface for directly connecting the optical flow detector to another port of the injector valve.

2. The liquid chromatography assembly of claim 1, wherein the optical flow detector is a fiber-coupled flow cell.

3. The liquid chromatography assembly of claim 1, wherein the optical flow detector is a cross-capillary fiber-coupled remote optical flow cell.

4. The liquid chromatography assembly of claim 1, wherein the preheater and the liquid chromatography column are oriented such that a longitudinal axis of the liquid chromatography column is substantially parallel with a longitudinal axis of the preheater.

5. The liquid chromatography assembly of claim 1, further comprising insulation for insulating the liquid chromatography column and the preheater while directly connected to the injector valve.

* * * * *